US008264975B2

(12) United States Patent
Yuan et al.

(10) Patent No.: US 8,264,975 B2
(45) Date of Patent: *Sep. 11, 2012

(54) FFT-BASED ESTIMATION OF THERMAL NOISE AND RISE OVER THERMAL IN A WIRELESS COMMUNICATION SYSTEM

(75) Inventors: Lu Yuan, Carlsbad, CA (US); Danlu Zhang, San Diego, CA (US); Mehraban Iraninejad, Del Mar, CA (US); Sharad Sambhwani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/242,569

(22) Filed: Sep. 30, 2008

(65) Prior Publication Data

US 2009/0207746 A1    Aug. 20, 2009

Related U.S. Application Data

(60) Provisional application No. 61/030,135, filed on Feb. 20, 2008.

(51) Int. Cl.
  *H04L 12/26* (2006.01)
  *H04J 11/00* (2006.01)
(52) U.S. Cl. .................... 370/252; 370/208
(58) Field of Classification Search .................. 370/252, 370/208
See application file for complete search history.

(56) References Cited

U.S. PATENT DOCUMENTS

| | | | | |
|---|---|---|---|---|
| 4,054,785 | A | * | 10/1977 | Lehmann .................. 708/405 |
| 6,036,351 | A | * | 3/2000 | Wagstaff .................. 708/321 |
| 6,397,041 | B1 | * | 5/2002 | Ballard et al. ............. 455/67.11 |
| 7,046,694 | B2 | * | 5/2006 | Kumar ..................... 370/487 |
| 7,245,893 | B1 | | 7/2007 | Husted et al. |

(Continued)

FOREIGN PATENT DOCUMENTS

EP    1596502 A2    11/2005

(Continued)

OTHER PUBLICATIONS

International Search Report and The Written Opinion—PCT/US2009/034357 International Search Authority—European Patent Office—Jul. 27, 2009.

*Primary Examiner* — Derrick Ferris
*Assistant Examiner* — Angel Brockman
(74) *Attorney, Agent, or Firm* — Charles Chesney

(57) ABSTRACT

Techniques for estimating thermal noise and rise-over-thermal (RoT) in a communication system are described. Thermal noise in a sideband may be measured and used as an estimate of thermal noise in a signal band. In one design, samples containing a desired signal centered at DC or a frequency higher than DC may be partitioned into blocks of K samples. Each block of K samples may be transformed with an FFT to obtain a corresponding block of K transform coefficients for K frequency bins. The power of transform coefficients for frequency bins in the sideband may be computed. Thermal noise may be estimated based on power values for the frequency bins in the sideband. Power values for frequency bins in the signal band may also be obtained and used to estimate total received power. RoT may then be estimated based on the estimated thermal noise and the estimated total received power.

36 Claims, 12 Drawing Sheets

U.S. PATENT DOCUMENTS

| | | | |
|---|---|---|---|
| 7,373,163 B2 * | 5/2008 | Kim et al. | 455/522 |
| 2005/0054295 A1 | 3/2005 | Moloudi | |
| 2005/0254588 A1 * | 11/2005 | Kim et al. | 375/260 |
| 2005/0273320 A1 * | 12/2005 | Yamaguchi et al. | 704/205 |
| 2006/0211441 A1 * | 9/2006 | Mese et al. | 455/522 |
| 2007/0054692 A1 | 3/2007 | Nie et al. | |
| 2007/0202826 A1 * | 8/2007 | Dean | 455/230 |
| 2007/0237067 A9 * | 10/2007 | Borran et al. | 370/208 |
| 2007/0270100 A1 | 11/2007 | Agrawal et al. | |
| 2009/0088146 A1 * | 4/2009 | Wigren et al. | 455/423 |

FOREIGN PATENT DOCUMENTS

| | | |
|---|---|---|
| WO | WO2006038786 | 4/2006 |
| WO | WO2007117188 | 10/2007 |
| WO | WO2008004924 | 1/2008 |
| WO | WO2008134337 | 11/2008 |

* cited by examiner

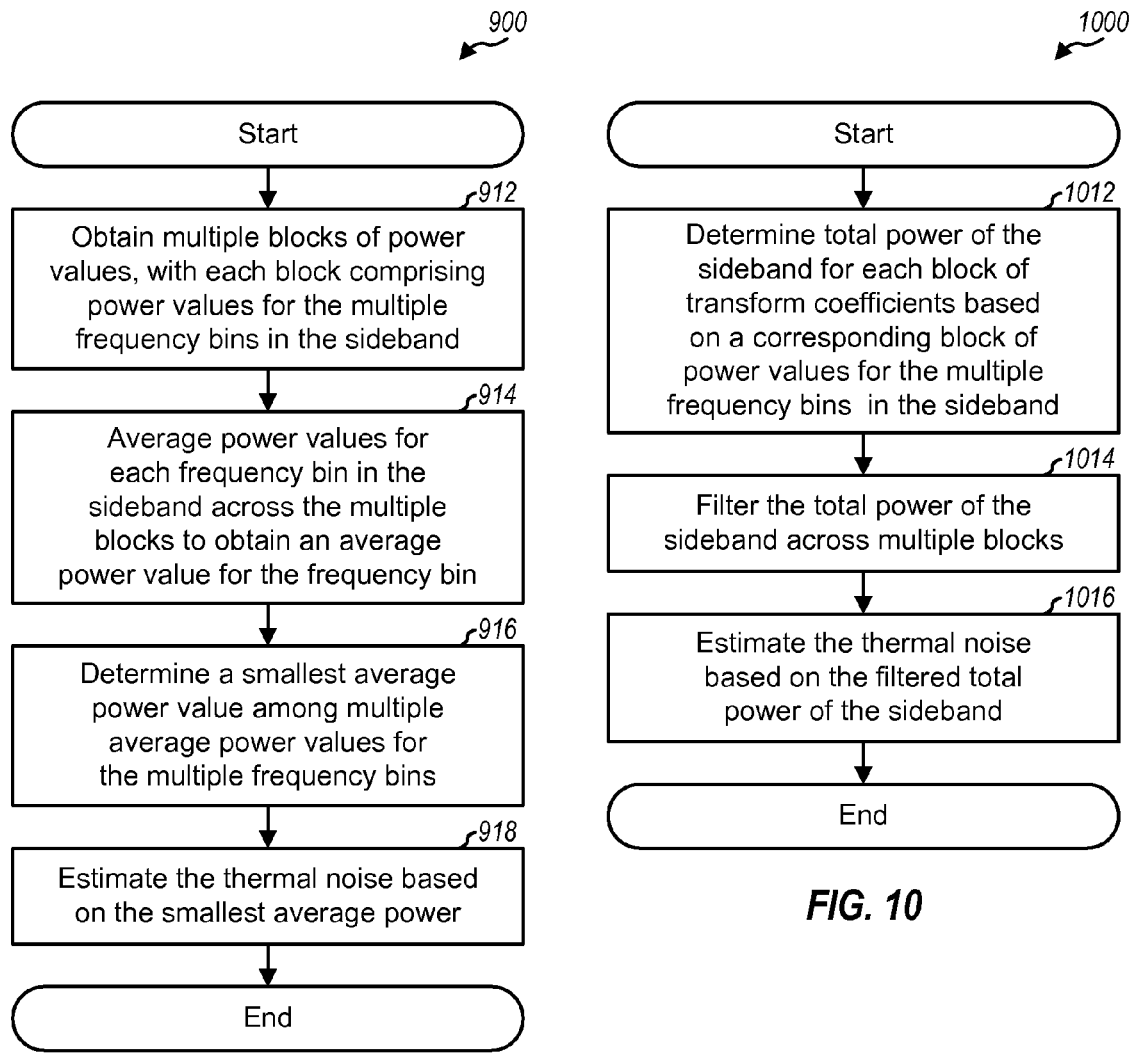

FFT-BASED ESTIMATION OF THERMAL NOISE AND RISE OVER THERMAL IN A WIRELESS COMMUNICATION SYSTEM

The present Application for Patent claims priority to Provisional Application No. 61/030,135 entitled "Method And Apparatus To Estimate Side Band Thermal Noise For Rise Over Thermal In A WCDMA System" filed Feb. 20, 2008, and assigned to the assignee hereof and hereby expressly incorporated by reference herein.

BACKGROUND

I. Field

The present disclosure relates generally to communication, and more specifically to techniques for estimating thermal noise and rise-over-thermal (RoT) in a wireless communication system.

II. Background

Wireless communication systems are widely deployed to provide various communication services such as voice, video, packet data, messaging, broadcast, etc. These systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

In a CDMA communication system, multiple user equipments (UEs) may currently transmit on the uplink to a Node B. The transmission from each UE acts as interference to the transmissions from other UEs at the Node B. The received signal quality of a given UE is dependent on various factors such as the amount of transmit power used by the UE, the path loss from the UE to the Node B, the amount of interference observed by the UE at the Node B, etc. The total interference at the Node B increases when the UEs increase their transmit power and/or when more UEs are added. At some point, the UEs cannot further increase their transmit power and no more UEs can be added. The capacity of the CDMA system may thus be interference-limited on the uplink.

RoT is a ratio of total noise and interference to thermal noise at a Node B. RoT is a fundamental measure of loading on the uplink in a CDMA system. It may be desirable to accurately estimate RoT in order to maintain the uplink loading below a target level to avoid system instability. An accurate estimate of thermal noise is needed for an accurate estimate of RoT.

SUMMARY

Techniques for estimating thermal noise and RoT in a communication system are described herein. Thermal noise density may be assumed to be constant across frequency. Thermal noise in a sideband may then be measured and used as an estimate of thermal noise in a signal band.

In one design, samples comprising a desired signal centered at direct current (DC) or a frequency higher than DC may be obtained. The samples may be partitioned into blocks of K samples, where K>1. Each block of K samples may be transformed, e.g., with a fast Fourier transform (FFT), to obtain a corresponding block of K transform coefficients for K frequency bins. The power of transform coefficients for frequency bins in a sideband may be computed to obtain power values for these frequency bins. Thermal noise may be estimated based on the power values for the frequency bins in the sideband. Power values for frequency bins in a signal band may also be obtained and used to estimate total received power. RoT may then be estimated based on the estimated thermal noise and the estimated total received power.

In one design, the thermal noise may be estimated based on a minimum point in the sideband. Power values for each frequency bin in the sideband may be averaged across multiple blocks to obtain an average power value for the frequency bin. The thermal noise may then be estimated based on the smallest average power value among the average power values for all frequency bins in the sideband.

In another design, the thermal noise may be estimated based on total power of the sideband. For each block of transform coefficients, the total power of the sideband may be determined based on (e.g., by accumulating) the power values for the frequency bins in the sideband. The total power of the sideband may be filtered across multiple blocks. The thermal noise may then be estimated based on the filtered total power of the sideband.

Various aspects and features of the disclosure are described in further detail below.

BRIEF DESCRIPTION OF THE DRAWINGS

FIG. 9 shows a process for estimating thermal noise based on a minimum point in the sideband.

FIG. 10 shows a process for estimating thermal noise based on total power of the sideband.

DETAILED DESCRIPTION

The techniques described herein may be used for various wireless communication systems such as CDMA, TDMA, FDMA, OFDMA and SC-FDMA systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.20, IEEE 802.16 (WiMAX), 802.11 (WiFi), Flash-OFDM®, etc. UTRA and E-UTRA are part of Universal Mobile Telecommunication System (UMTS). 3GPP Long Term Evolution (LTE) is an upcoming release of UMTS that uses E-UTRA. UTRA, E-UTRA, UMTS, LTE and GSM are described in documents from an organization named "3rd Generation Partnership Project"

(3GPP). cdma2000 and UMB are described in documents from an organization named "3rd Generation Partnership Project 2" (3GPP2).

For clarity, certain aspects of the techniques are described below for UMTS, and 3GPP terminology is used in much of the description below. In the following description, the term "CDMA" generically refers to any variant of CDMA (e.g., WCDMA, cdma2000, etc.), and the term "WCDMA" refers to the specific variant of CDMA defined by 3GPP.

Figure 1:
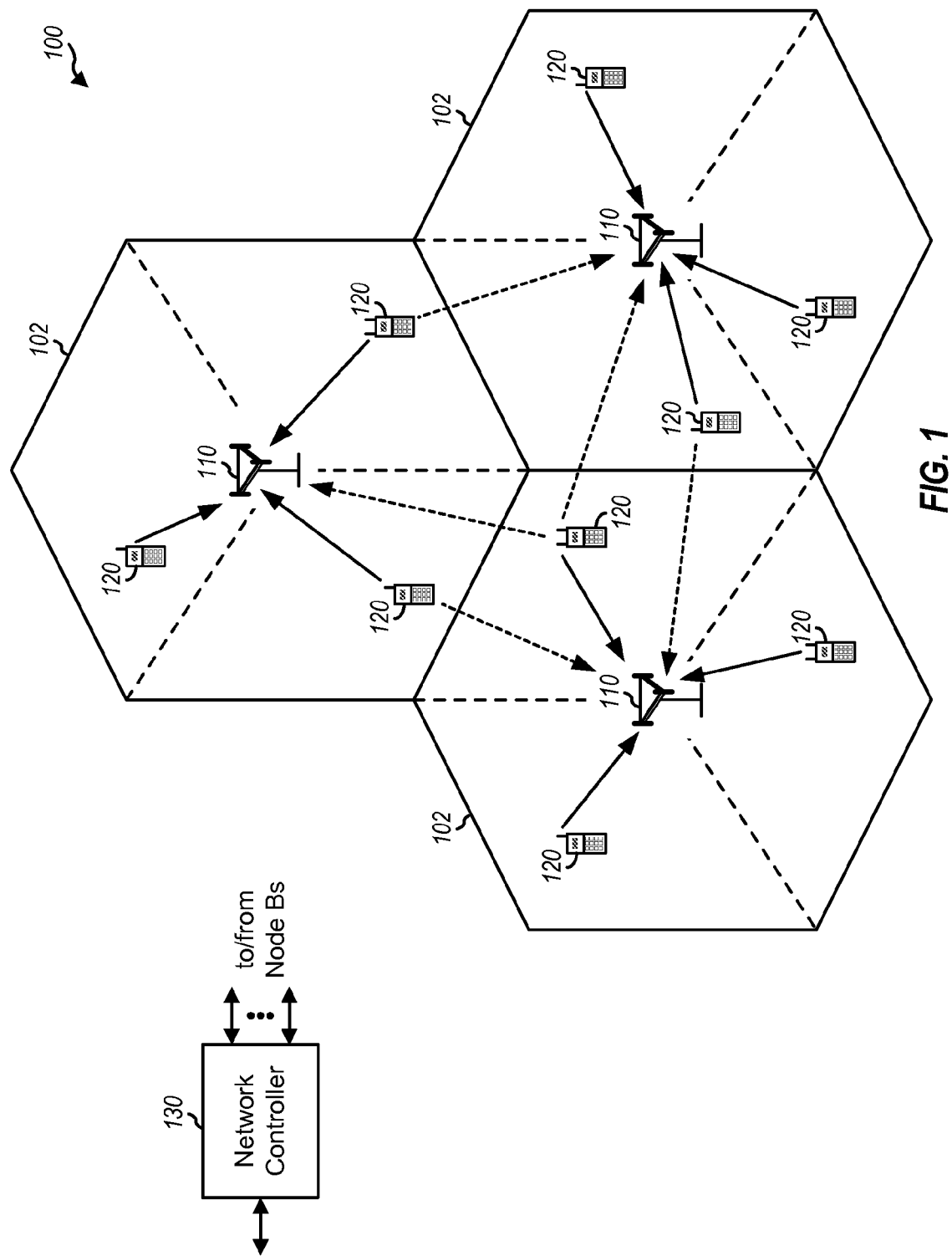
FIG. 1 shows a wireless communication system.

FIG. 1 shows a wireless communication system 100, which may be a Universal Terrestrial Radio Access Network (UTRAN) in UMTS. System 100 includes multiple Node Bs 110. A Node B is a fixed station that communicates with the UEs and may also be referred to as an evolved Node B (eNB), a base station, an access point, etc. Each Node B 110 provides communication coverage for a particular geographic area 102 and supports communication for the UEs located within the coverage area. The coverage area of a Node B may be partitioned into multiple (e.g., three) smaller areas, and each smaller area may be served by a respective Node B subsystem. In 3GPP, the term "cell" can refer to the smallest coverage area of a Node B and/or a Node B subsystem serving this coverage area, depending on the context in which the term is used. In 3GPP2, the term "sector" can refer to the smallest coverage area of a base station and/or a base station subsystem serving this coverage area. For clarity, the concept of cell in 3GPP is used in the description below.

A network controller 130 may couple to Node Bs 110 and provide coordination and control for these Node Bs. Network controller 130 may be a single network entity or a collection of network entities. For example, network controller 130 may be a Radio Network Controller (RNC) in UMTS.

UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless communication device, a handheld device, a wireless modem, a laptop computer, etc. A UE may communicate with a Node B via the downlink and uplink. The downlink (or forward link) refers to the communication link from the Node B to the UE, and the uplink (or reverse link) refers to the communication link from the UE to the Node B. For clarity, FIG. 1 shows only uplink transmissions from UEs 120 to Node Bs 110. In FIG. 1, a solid line with a single arrow indicates a transmission to a serving cell, and a dashed line with a single arrow indicates a transmission to a non-serving cell. The terms "UE" and "user" are used interchangeably herein.

As shown in FIG. 1, each cell may receive transmissions from users served by that cell as well as transmissions from users not served by the cell. The total interference observed at each cell is composed of (i) intra-cell interference from users within that cell and (ii) inter-cell interference from users in other cells. The inter-cell interference and intra-cell interference may have a large impact on performance and may be taken into account in scheduling users.

For CDMA, the total throughput of a cell on the uplink is dependent on the RoT observed by that cell. The cell throughput increases by a larger percentage at low RoT and asymptotically reaches a maximum value at high RoT. It may be desirable to accurately estimate/measure RoT at the cell. The estimated RoT may be used to admit and/or schedule users in the cell and to ensure that the cell operates at a target RoT. The RoT of the cell may be expressed as:

$$RoT = \frac{I_0}{N_0}, \quad \text{Eq (1)}$$

where $I_0$ is the total noise and interference observed by the cell, and
$N_0$ is the thermal noise observed by the cell.

As shown in equation (1), an accurate estimate of RoT may be obtained with an accurate estimate of $I_0$ as well as an accurate estimate of $N_0$. $I_0$ may be estimated based on the total received power at the cell, as described below. $N_0$ may be estimated based on the total received power during a silence interval in which no users transmit on the uplink. However, such a silence interval may not be available in some systems. For example, it may be difficult to obtain a silence interval in an asynchronous system in which the timing of each cell may be asynchronous with the timing of other cells.

In an aspect, the thermal noise $N_0$ may be estimated in a sideband outside of a signal band, e.g., a sideband between adjacent CDMA channels. A sideband may also be referred to as a guard band, a stopband, etc. Thermal noise density may be assumed to be constant across frequency. Thermal noise in the sideband may then be measured and used as an estimate of thermal noise in the signal band.

Figure 2:
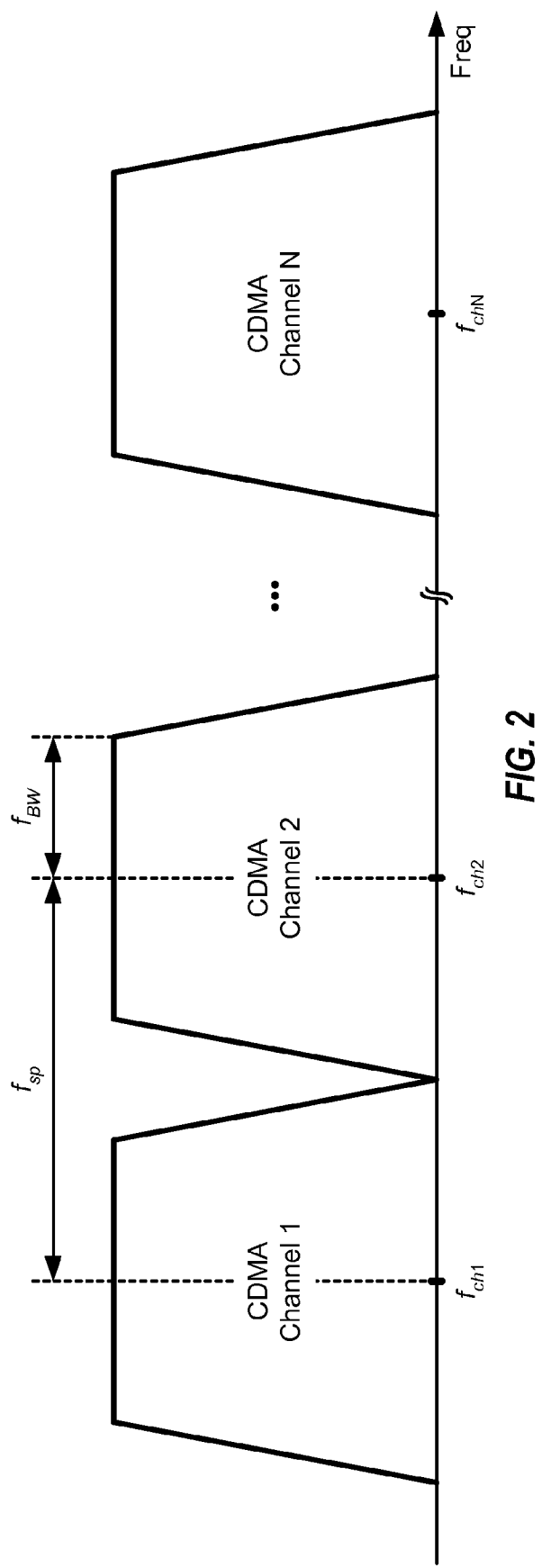
FIG. 2 shows multiple CDMA channels in a frequency band.

FIG. 2 shows an example of N CDMA signals on N CDMA channels in a frequency band, where N may be any integer value. A CDMA channel may also be referred to as a UMTS channel, a frequency channel, a carrier, etc. The N CDMA signals may be centered at frequencies of $f_{ch1}$ to $f_{chN}$, which may be selected by a network operator. Each CDMA signal has a one-sided bandwidth of $f_{BW}$, which may be determined based on a chip rate of $f_{chip}$ used by the system, or $f_{BW}=f_{chip}/2$. Adjacent CDMA channels may be spaced apart by $f_{sp}$, where in general $f_{sp}>2f_{BW}$. For WCDMA, the chip rate is 3.84 megachips/second (Mcps), and a WCDMA signal has a two-sided bandwidth of $2f_{BW}=3.84$ MHz. The spacing between adjacent WCDMA channels may be 5.0 MHz nominally but may be as close as 4.8 MHz.

A WCDMA signal is required to have output power conforming to a spectrum emission mask. The spectrum emission mask requires the WCDMA signal level to be down by at least 35 decibels (dB) at 2.5 MHz offset from the carrier/center frequency, and by more than 35 dB at greater frequency offset. The emission requirements for WCDMA are given in 3GPP TS 25.101, entitled "User Equipment (UE) radio transmission and reception (FDD)," which is publicly available.

Figure 3:
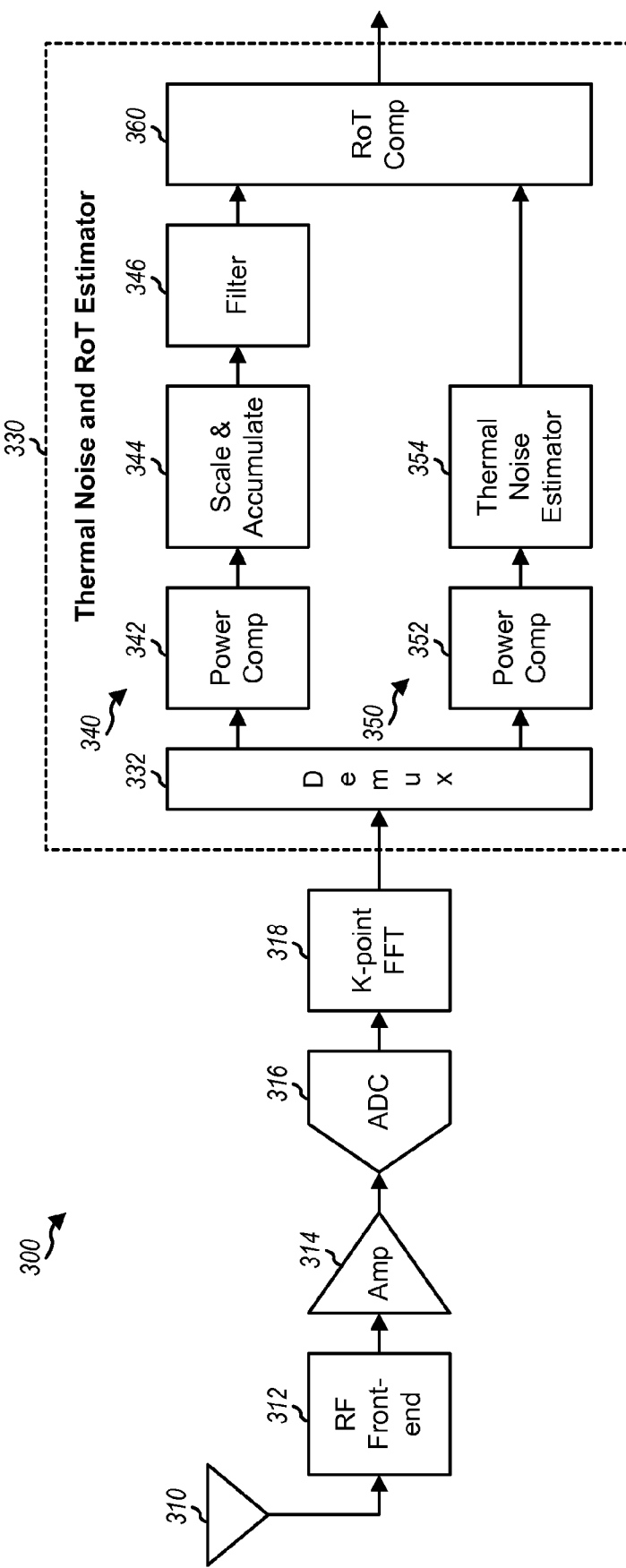
FIG. 3 shows a receiver capable of estimating thermal noise and RoT.

FIG. 3 shows a block diagram of a design of a receiver 300 capable of estimating thermal noise and RoT. Receiver 300 may be part of a Node B or some other entity. Within receiver 300, an antenna 310 receives uplink signals from UEs and provides a received RF signal to an RF front-end unit 312. Within RF front-end unit 312, the received RF signal may be amplified by a low noise amplifier (LNA), filtered by a bandpass filter, and downconverted by a mixer.

Receiver 300 may implement an oversampling design or an undersampling design, which may have the characteristics given below.

Oversampling design—the sampling rate of an analog-to-digital converter (ADC) is higher than a Nyquist rate of an analog signal being digitized; and Undersampling design—the ADC sampling rate is lower than the Nyquist rate of the analog signal being digitized.

The Nyquist rate is twice the bandwidth or maximum component frequency of the analog signal being digitized. The Nyquist rate is a lower bound of the sampling rate that satisfies a Nyquist sampling criterion for the analog signal being digitized.

In one design of oversampling, RF front-end unit 312 provides a downconverted signal comprising a desired CDMA signal centered at or near DC. The ADC sampling rate is at least twice the highest component frequency of the CDMA signal. In one design of undersampling, RF front-end unit 312 provides a downconverted signal comprising a desired CDMA signal centered at an intermediate frequency (IF). The ADC sampling rate is less than twice the IF frequency and may be either lower or higher than the center frequency of the CDMA signal. Undersampling may also be referred to as IF sampling. In general, the desired CDMA signal may be downconverted by RF front-end unit 312 to any frequency suitable for subsequent processing. An amplifier (Amp) 314 amplifies the downconverted signal from RF front-end unit 312 with a gain of G and provides an analog input signal. The gain G may be selected such that the thermal noise floor of the analog input signal is higher than the quantization noise of a subsequent ADC 316.

ADC 316 digitizes the analog input signal and provides samples at a sampling rate of $f_{samp}$, which may be selected such that $f_{samp} > 2f_{BW}$. In the oversampling design, ADC 316 oversamples the desired CDMA signal, which may be centered at or near DC. In the undersampling design, ADC 316 undersamples the desired CDMA signal, which may be centered at IF and aliased to DC or a frequency higher than DC due to undersampling. For both designs, the samples include the desired CDMA signal within a frequency range of 0 to $f_{samp}$.

Figure 4A:
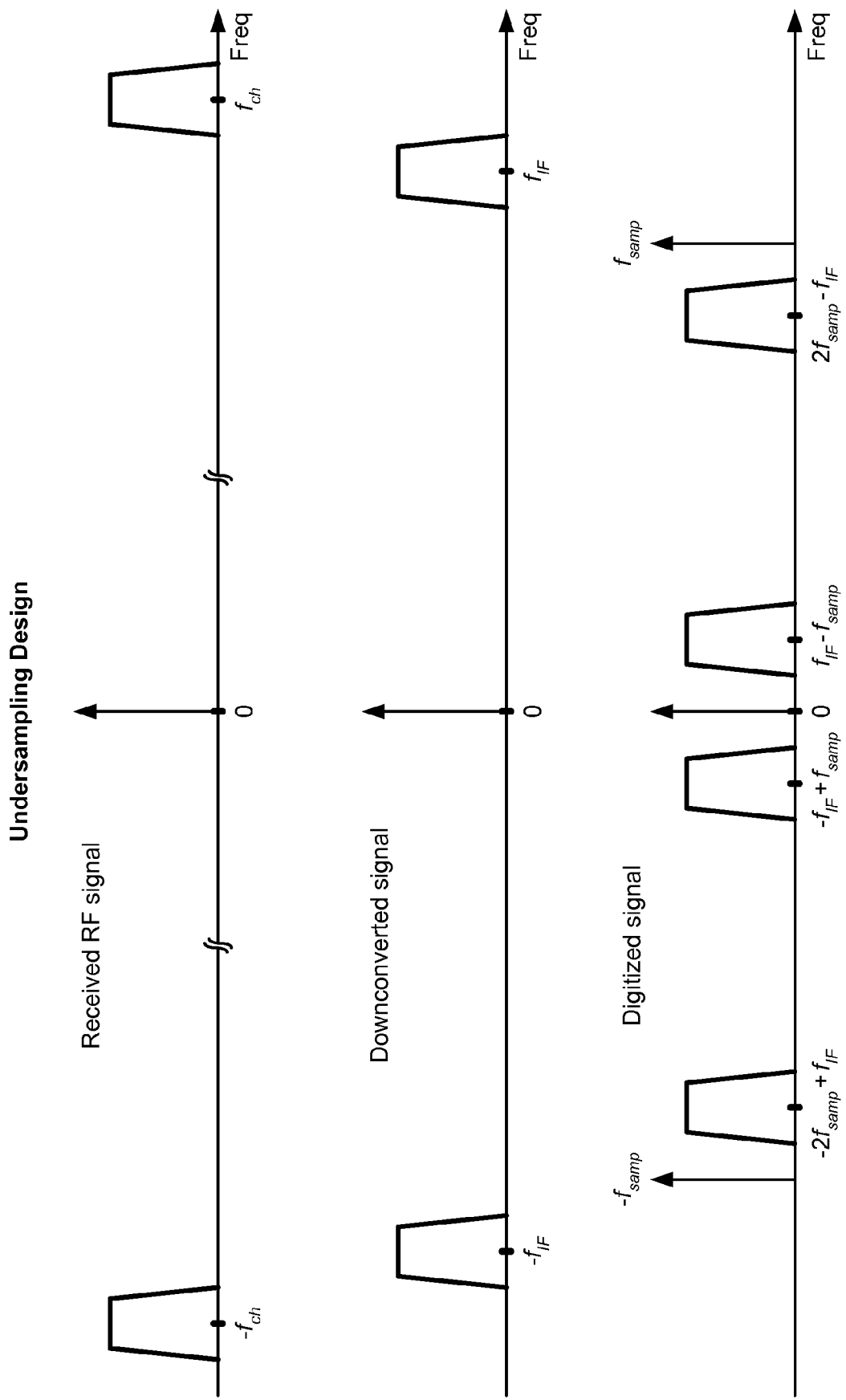
FIGS. 4A and 4B show downconversion and undersampling by the receiver.

FIG. 4A shows a design of downconversion and undersampling by receiver 300. The received RF signal provided to RF front-end unit 312 includes a desired CDMA signal centered at a frequency of $f_{ch}$. RF front-end unit 312 downconverts the received RF signal from RF to IF and provides the downconverted signal comprising the desired CDMA signal centered at a frequency of $f_{IF}$. ADC 316 digitizes the downconverted signal at the sampling rate of $f_{samp}$ and provides a digitized signal. In this design, the desired CDMA signal is undersampled, which results in images of the desired CDMA signal appearing at frequencies of $\pm(f_{IF}-f_{samp})$ and $\pm(2f_{samp}-f_{IF})$. For example, the IF frequency may be $f_{IF}=70$ MHz, the sampling rate may be 16 times the chip rate or $f_{samp}=61.44$ megasamples/second (Msps) for WCDMA, and the CDMA signal images may be at ±8.56 MHz and ±52.88 MHz.

Figure 4B:
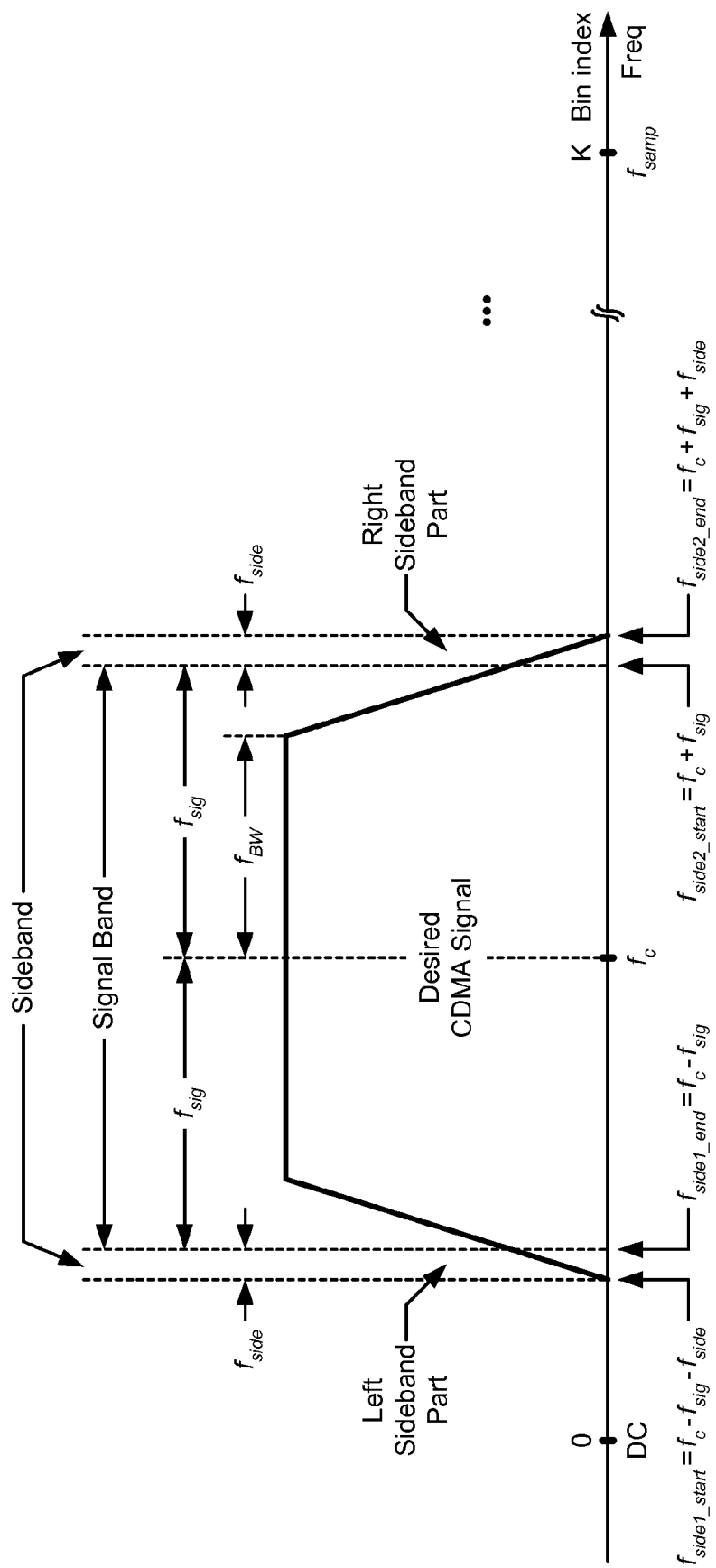

FIG. 4B shows the digitized signal from ADC 316 for the undersampling design shown in FIG. 4A. The digitized signal includes the desired CDMA signal centered at a frequency of $f_c$, which is dependent on the IF frequency of the downconverted signal from RF front-end unit 312 and the sampling rate of ADC 316. The two-sided signal band of the CDMA signal has a width of $2f_{sig}$ and is from frequency $f_{sig\_start}$ to frequency $f_{sig\_end}$, which may be given as:

$$f_{sig\_start}=f_c-f_{sig}, \text{ and}$$

$$f_{sig\_end}=f_c+f_{sig}. \qquad \text{Eq (2)}$$

The one-sided signal band $f_{sig}$ may be less than, equal to, or greater than the one-sided bandwidth $f_{BW}$ of the CDMA signal and may be selected based on signal characteristics. In one design, the two-sided signal band $2f_{sig}$ may be selected as the bandwidth that captures a predetermined percentage (e.g., 99%) of the total received power after matched filtering.

When the desired CDMA signal is not centered at DC, as shown in FIGS. 4A and 4B, the sideband may include a left sideband part (or left shoulder) and a right sideband part (or right shoulder). The left sideband part has a width offside and is from frequency $f_{side1\_start}$ to frequency $f_{side1\_end}$. The right sideband part has a width of $f_{side}$ and is from frequency $f_{side2\_start}$ to frequency $f_{side2\_end}$. The start and end frequencies of the two sideband parts may be given as:

$$f_{side1\_start}=f_c-f_{sig}-f_{side},$$

$$f_{side1\_end}=f_c-f_{sig},$$

$$f_{side2\_start}=f_c+f_{sig}, \text{ and}$$

$$f_{side2\_end}=f_c+f_{sig}+f_{side}. \qquad \text{Eq (3)}$$

Figure 5A:
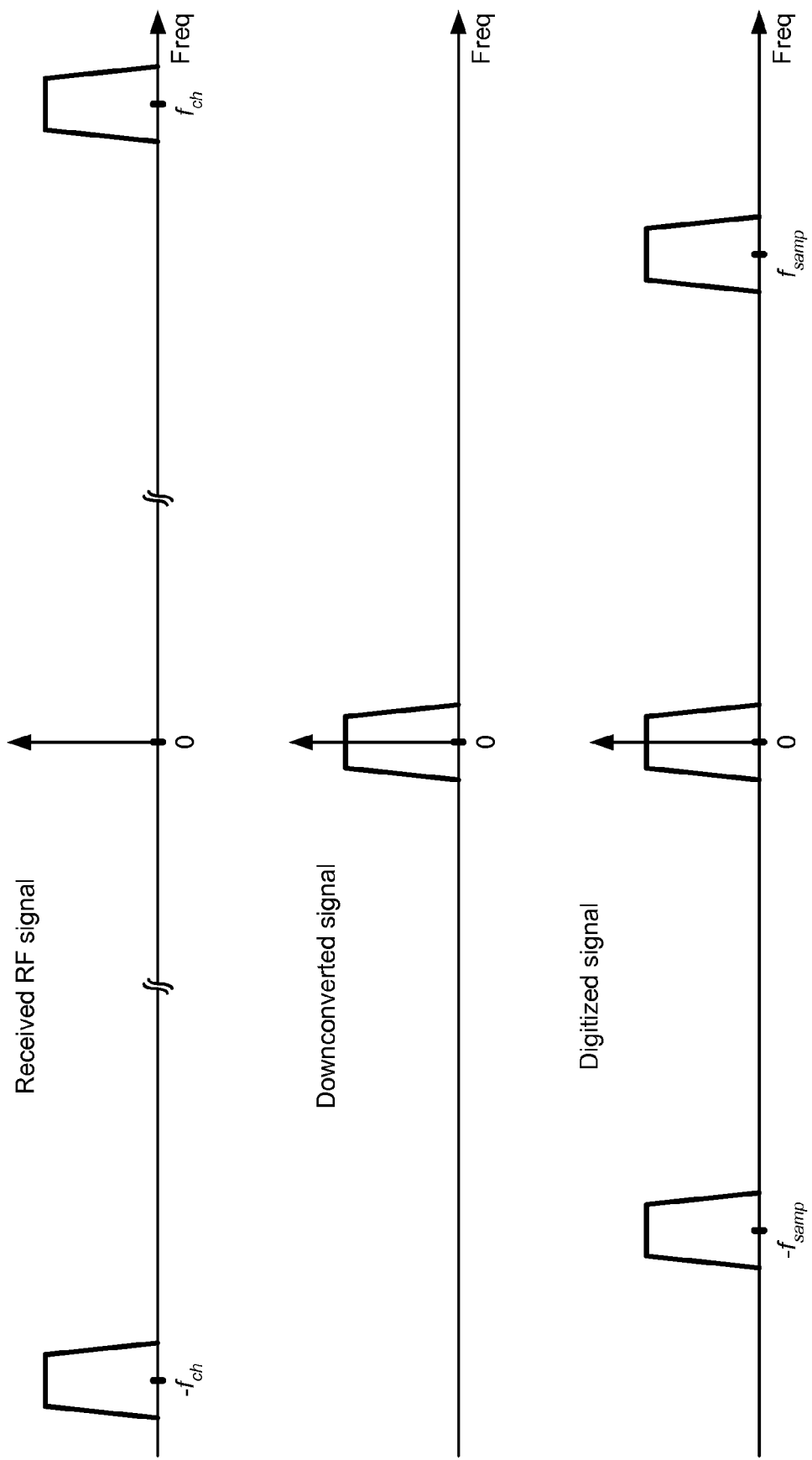
FIGS. 5A and 5B show downconversion and oversampling by the receiver.

FIG. 5A shows a design of downconversion and oversampling by receiver 300. In this design, RF front-end unit 312 downconverts the received RF signal from RF to DC and provides the downconverted signal comprising the desired CDMA signal centered at DC. ADC 316 digitizes the downconverted signal at the sampling rate of $f_{samp}$ and provides the digitized signal containing images of the CDMA signal centered at DC and $\pm f_{samp}$.

Figure 5B:
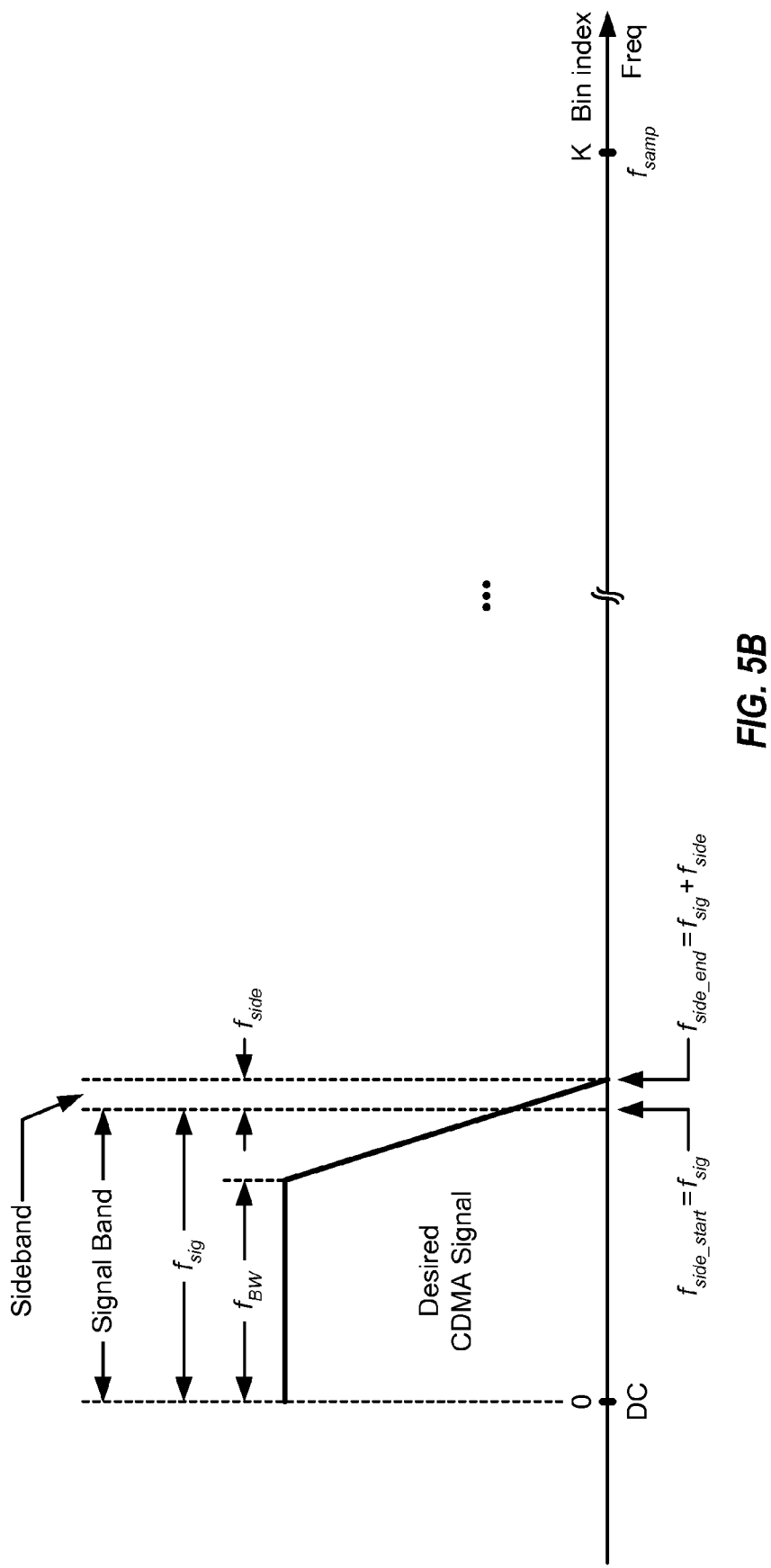

FIG. 5B shows the digitized signal from ADC 316 for the oversampling design shown in FIG. 5A. The digitized signal includes the desired CDMA signal centered at DC. The one-sided signal band of the CDMA signal has a width of $f_{sig}$ and is from frequency $f_{sig\_start}=DC$ to frequency $f_{sig\_end}=f_{sig}$. The sideband has a width of $f_{side}$ and is from frequency $f_{side\_start}$ to frequency $f_{side\_end}$. The start and end frequencies of the sideband may be given as:

$$f_{side\ start}=f_{sig}, \text{ and}$$

$$f_{side\_end}=f_{sig}+f_{side}. \qquad \text{Eq (4)}$$

The signal band and the sideband may cover frequency ranges different from those shown in FIGS. 4B and 5B. The width of each sideband part may be selected based on the spacing between CDMA channels and/or other factors. The signal band may be contiguous with the sideband, as shown in FIGS. 4B and 5B, or may be non-contiguous with the sideband.

Referring back to FIG. 3, ADC 316 may be selected such that its quantization noise is below the thermal noise floor and its dynamic range is sufficient for the largest expected received signal. In one design, ADC 316 has a target variance of 32 when the receiver input is removed, which correspond to five bits being used for quantization. In one design, 13 dB or more of dynamic range may be handled with four or more additional bits. ADC 316 may thus have 9 or more bits. Other bit width may also be used for ADC 316.

The samples from ADC 316 are partitioned into blocks. In one design, each block includes K consecutive samples, and the blocks are non-overlapping. In another design, the blocks are overlapping, and each block includes some samples from a prior block as well as new samples. In any case, K may be any suitable integer value and may be a power of two. An FFT unit 318 performs a K-point FFT on each block of K samples and provides a corresponding block of K transform coefficients for K frequency bins to a thermal noise and RoT estimator 330. The K frequency bins cover a frequency range of 0 to $f_{samp}$, and adjacent frequency bins have a spacing of $\Delta f = f_{samp}/K$.

Within thermal noise and RoT estimator 330, a demultiplexer (Demux) 332 receives the K transform coefficients for each block, provides transform coefficients for frequency bins in the signal band to a first processing path 340, and provides transform coefficients for frequency bins in the sideband to a second processing path 350. Path 340 estimates the total received power in the signal band. Path 350 estimates the thermal noise in the sideband.

Within first processing path 340, a power computation (Comp) unit 342 computes the power of each transform coefficient in the signal band and provides a corresponding power value. For each block, a unit 344 scales the power values for the frequency bins in the signal band, accumulates the scaled power values, and provides the accumulated power as the signal band power, as follows:

$$P_{sig}(m) = \sum_{k=k_{sig\_start}}^{k_{sig\_end}} |Y_m(k)|^2 \cdot |H(k)|^2 \quad \text{Eq (5)}$$

$$= \sum_{k=k_{sig\_start}}^{k_{sig\_end}} |Y_m(k) \cdot H(k)|^2,$$

where $Y_m(k)$ is a transform coefficient for frequency bin k in block m,

H(k) is a weight for frequency bin k, and $P_{sig}(m)$ is the signal band power for block m.

The weight H(k) may be determined based on a matched filter used in a data path to process uplink signals from the users. As shown in equation (5), the scaling for the weight H(k) may be performed before or after computing the power of each frequency bin. The order shown in FIG. 3 may reduce computational complexity. Equation (5) sums the weighted power of the transform coefficients from frequency bin $k_{sig\_start}$ to frequency bin $k_{sig\_end}$ and provides the signal band power for the block. Frequency bins $k_{sig\_start}$ and $k_{sig\_end}$ may be given as:

$$k_{sig\_start} = K \cdot f_{sig\_start}/f_{samp}, \text{ and}$$

$$k_{sig\_end} = K \cdot f_{sig\_end}/f_{samp}. \quad \text{Eq (6)}$$

In one design, a filter 346 filters the signal band power with an infinite impulse response (IIR) filter, as follows:

$$\tilde{P}_{sig}(m) = \alpha_{sig} \cdot P_{sig}(m) + (1-\alpha_{sig}) \cdot \tilde{P}_{sig}(m-1), \quad \text{Eq (7)}$$

where $\alpha_{sig}$ is an IIR coefficient that determines the amount of averaging, and $\tilde{P}_{sig}(m)$ is the filtered signal band power for block m.

The IIR coefficient $\alpha_{sig}$ may be selected based on the desired amount of averaging for the signal band power. In one design, each block covers 0.2 slots or 0.133 milliseconds (ms) in WCDMA, and the IIR coefficient may be selected as $\alpha_{sig} = 1/128$ to obtain a time constant of approximately 25 slots. Other values may also be used for the IIR coefficient. The filtering may also be performed with a finite impulse response (FIR) filter, a moving average filter, etc. In any case, filter 346 provides the filtered signal band power for each block as the total received power to an RoT computation unit 360.

Within second processing path 350, a power computation unit 352 computes the power of each transform coefficient in the sideband and provides a corresponding power value. A thermal noise estimator 354 receives the power values for all frequency bins in the sideband and provides an estimate of the thermal noise. The thermal noise estimation may be performed in several manners.

Figure 6A:
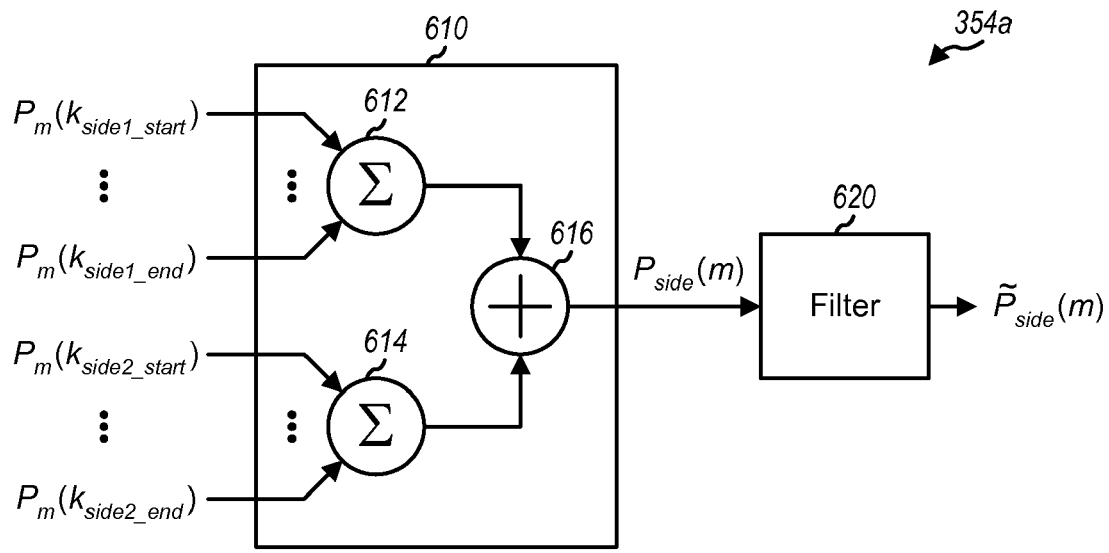
FIGS. 6A and 6B show two designs of a thermal noise estimator.

FIG. 6A shows a block diagram of a thermal noise estimator 354a, which implements a first thermal noise estimation design. Thermal noise estimator 354a includes a sideband power computation unit 610 and a filter 620. Unit 610 computes the sideband power for each block of transform coefficients. Filter 620 averages the sideband power across multiple blocks and provides the estimated sideband power.

Within unit 610, a summer 612 sums the power values for the frequency bins in the left sideband part for each block. A summer 614 sums the power values for the frequency bins in the right sideband part for each block. A summer 616 sums the outputs of summers 612 and 614 and provides the sideband power for each block, which may be expressed as:

$$P_{side}(m) = \sum_{k=k_{side1\_start}}^{k_{side1\_end}} |Y_m(k)|^2 + \sum_{k=k_{side2\_start}}^{k_{side2\_end}} |Y_m(k)|^2, \quad \text{Eq (8)}$$

where $P_{side}(m)$ is the sideband power for block m.

Equation (8) is applicable for the design shown in FIG. 4B. The left summation sums the power of the transform coefficients in the left sideband part from frequency bin $k_{side1\_start}$ to frequency bin $k_{side1\_end}$. The right summation sums the power of the transform coefficients in the right sideband part from frequency bin $k_{side2\_start}$ to frequency bin $k_{side2\_end}$. The sideband power is equal to the sum of the total powers for the left and right sideband parts. Frequency bins $k_{side1\_start}$, $k_{side1\_end}$, $k_{side2\_start}$ and $k_{side2\_end}$ may be given as:

$$k_{side1\_start} = K \cdot f_{side1\_start}/f_{samp},$$

$$k_{side1\_end} = K \cdot f_{side1\_end}/f_{samp},$$

$$k_{side2\_start} = K \cdot f_{side2\_start}/f_{samp}, \text{ and}$$

$$k_{side2\_end} = K \cdot f_{side2\_end}/f_{samp}. \quad \text{Eq (9)}$$

For the design shown in FIG. 5B, the accumulation of the power values for the frequency bins in the sideband for each block may be expressed as:

$$P_{side}(m) = \sum_{k=k_{side\_start}}^{k_{side\_end}} |Y_m(k)|^2, \quad \text{Eq (10)}$$

where $k_{side\_start} = K \cdot f_{side\_start}/f_{samp}$ and $k_{side\_end} = K \cdot f_{side\_end}/f_{samp}$.

In one design, the sideband power for each block may be computed based on transform coefficients for all frequency bins in the sideband, as shown in equation (8) or (10). In another design, the sideband power for each block may be computed based on transform coefficients for a subset of the frequency bins in the sideband. For example, transform coefficients larger than a threshold may be discarded, and the sideband power may be computed based on the undiscarded transform coefficients. The threshold may be determined based on the smallest average power for all frequency bins in the sideband, the average power for all frequency bins in the sideband, etc.

In one design, a filter 620 filters the sideband power with an IIR filter, as follows:

$$\tilde{P}_{side}(m) = \alpha_{side} \cdot P_{side}(m) + (1-\alpha_{side}) \cdot \tilde{P}_{side}(m-1), \quad \text{Eq (11)}$$

where $\alpha_{side}$ is an IIR coefficient that determines the amount of averaging, and $\tilde{P}_{side}(m)$ is the filtered sideband power for block m.

The IIR coefficient $\alpha_{side}$ may be selected based on the desired amount of averaging for the sideband power. Since the thermal noise power changes much slower than the signal power, $\alpha_{side}$ may be much smaller than $\alpha_{sig}$. In one design, $\alpha_{side}$ may be selected as follows:

$$\alpha_{side} \leq \alpha_{sig} \cdot \frac{f_{side}}{f_{sig}}. \qquad \text{Eq (12)}$$

If $f_{side} \ll f_{sig}$, then $\alpha_{side}$ may be a very small value, and the IIR filter for the sideband power may be implemented with arithmetic of sufficient precision.

In another design, filter 620 may compute a moving average of the sideband power over a window of length L. The window length L may be selected as $L \gg f_{sig}/(\alpha_{sig} \cdot f_{side})$. Filter 620 may also filter the sideband power with a FIR filter or in some other manner. In any case, filter 620 provides the filtered sideband power as the thermal noise to RoT computation unit 360 in FIG. 3.

Figure 6B:
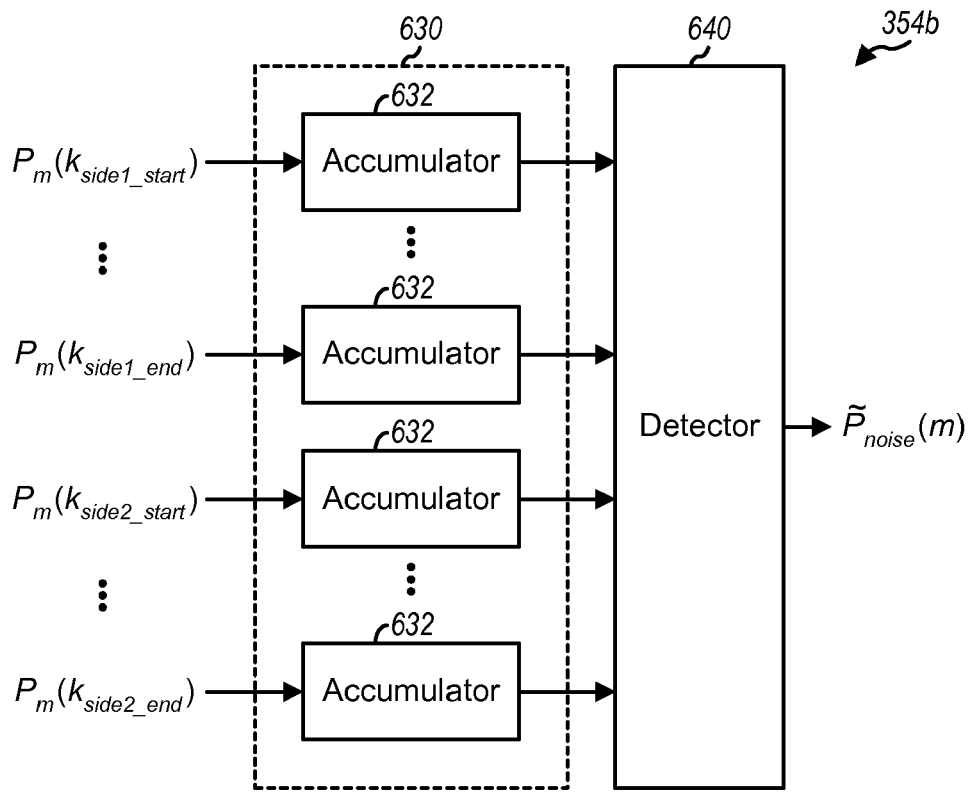

FIG. 6B shows a block diagram of a thermal noise estimator 354b, which implements a second thermal noise estimation design. Thermal noise estimator 354b includes an accumulation unit 630 and a detector 640. Unit 630 computes the average power of each frequency bin in the sideband. Detector 640 receives the average power values for all frequency bins in the sideband and provides the estimated thermal noise.

Within unit 630, a bank of accumulators 632 receives a set of power values for the frequency bins in the sideband for each block. The set includes $P_m(k_{side1\_start})$ to $P_m(k_{side1\_end})$ and $P_m(k_{side2\_start})$ to $P_m(k_{side2\_end})$ for the design shown in FIGS. 4B and 6B and includes $P_m(k_{side\_start})$ to $P_m(k_{side\_end})$ for the design shown in FIG. 5B. Each accumulator 632 accumulates M power values from M blocks for one frequency bin k in the sideband and provides an average power value for that frequency bin, as follows:

$$\overline{P}_m(k) = \sum_{i=0}^{M-1} |Y_{m-i}(k)|^2, \qquad \text{Eq (13)}$$

where $\overline{P}_m(k)$ is the average power value for frequency bin k after block m.

In equation (13), index k may be valid for only the frequency bins in the sideband, and index m may be valid for only certain block indices. In one design, unit 630 provides a set of average power values for all frequency bins in the sideband in every M-th block. M may be selected to obtain the desired amount of averaging. In one design, M may be selected to cover approximately 100 seconds.

Detector 640 receives the average power values for all frequency bins in the sideband. In one design, detector 640 determines the smallest average power value among the average power values for all frequency bins in the sideband and provides this smallest average power value as the estimated thermal noise, as follows:

$$\tilde{P}_{noise}(m) = \min \{\overline{P}_m(k_{side1\_start}), \ldots, \overline{P}_m(k_{side1\_end}), \\ \overline{P}_m(k_{side2\_start}), \ldots, \overline{P}_m(k_{side2\_end})\}, \qquad \text{Eq (14)}$$

where $\tilde{P}_{noise}(m)$ is the estimated thermal noise after block m.

The power of each frequency bin may include thermal noise, narrowband jammers, signal from the desired CDMA channel, signals from adjacent CDMA channels, etc. Jammers are large amplitude undesired signals that may have narrow bandwidth on the order of one or few frequency bins. The frequency bin with the lowest power may include only or mostly thermal noise whereas the frequency bins with higher power may include thermal noise as well as undesired signals. Thus, the smallest average power value may provide a more accurate estimate of the thermal noise.

In general, the thermal noise may be estimated based on one or more smallest average power values for one or more frequency bins in the sideband. Using fewer average power values may allow for better rejection of narrowband jammers and for accounting for sideband ripple effect from adjacent CDMA channels. Using more average power values may improve averaging.

Referring back to FIG. 3, RoT computation unit 360 receives the total received power $\tilde{P}_{sig}(m)$ from filter 346 and the estimated thermal noise $\tilde{P}_{side}(m)$ or $\tilde{P}_{noise}(m)$ from estimator 354. In one design, unit 360 computes the RoT as follows:

$$RoT = K_{cal} \cdot \frac{\tilde{P}_{sig}(m)/f_{sig,eff}}{\tilde{P}_{side}(m)/2f_{side}}, \qquad \text{Eq (15)}$$

where $K_{cal}$ is a calibration factor, and
$f_{sig,eff}$ is an effective signal bandwidth of the matched filter.
The effective signal bandwidth may be expressed as:

$$f_{sig,eff} = \sum_{k=k_{sig\_start}}^{k_{sig\_end}} |H(k)|^2, \qquad \text{Eq (16)}$$

where H(k) is assumed to be normalized so that the passband has a magnitude of 1.0.

In equation (15), the total received power is divided by $f_{sig,eff}$ to obtain the received power density, and the thermal noise power is divided by $2f_{side}$ to obtain the thermal noise density. Equivalently, the thermal noise power $\tilde{P}_{side}(m)$ for the sideband may be scaled by the ratio $f_{sig,eff}/2f_{side}$ to obtain the thermal noise power for the signal band. In any case, the scaling by $f_{sig,eff}$ and $2f_{side}$ ensures that RoT is computed using quantities of the same unit in both the numerator and denominator. The calibration factor $K_{cal}$ may be selected such that the RoT is normalized to 0 dB during calibration when no received signal is applied to the antenna input.

In another design, unit 360 computes the RoT as follows:

$$RoT = K_{cal} \cdot \frac{\tilde{P}_{sig}(m)/f_{sig,eff}}{\tilde{P}_{noise}(m)/M}. \qquad \text{Eq (17)}$$

In equation (17), the thermal noise power $\tilde{P}_{noise}(m)$ is divided by M to obtain the thermal noise power for one frequency bin in one block. The scaling by $f_{sig,eff}$ and M in equation (17) ensures that RoT is computed using quantities of the same unit in both the numerator and denominator.

In one example implementation of the design shown in FIG. 4B, the sampling rate is 16 times the chip rate and given as $f_{samp} = 16 \times 3.84 = 61.44$ MHz for WCDMA. 8192-point FFTs are performed on the samples from ADC 316, and the frequency bin spacing is 7.5 KHz. The signal band is $f_{sig} = 2.4$ MHz, which corresponds to 318 frequency bins. The sideband is between 2.4 and 2.5 MHz, or $f_{side} = 0.1$ MHz, which corresponds to 13 frequency bins. The signal band and the sideband may also be defined with other widths, which may be smaller or larger than the values given above. The start and stop frequencies for the signal band and the sideband may be defined differently depending on whether the desired CDMA signal is centered at DC or $f_c$.

Figure 7:
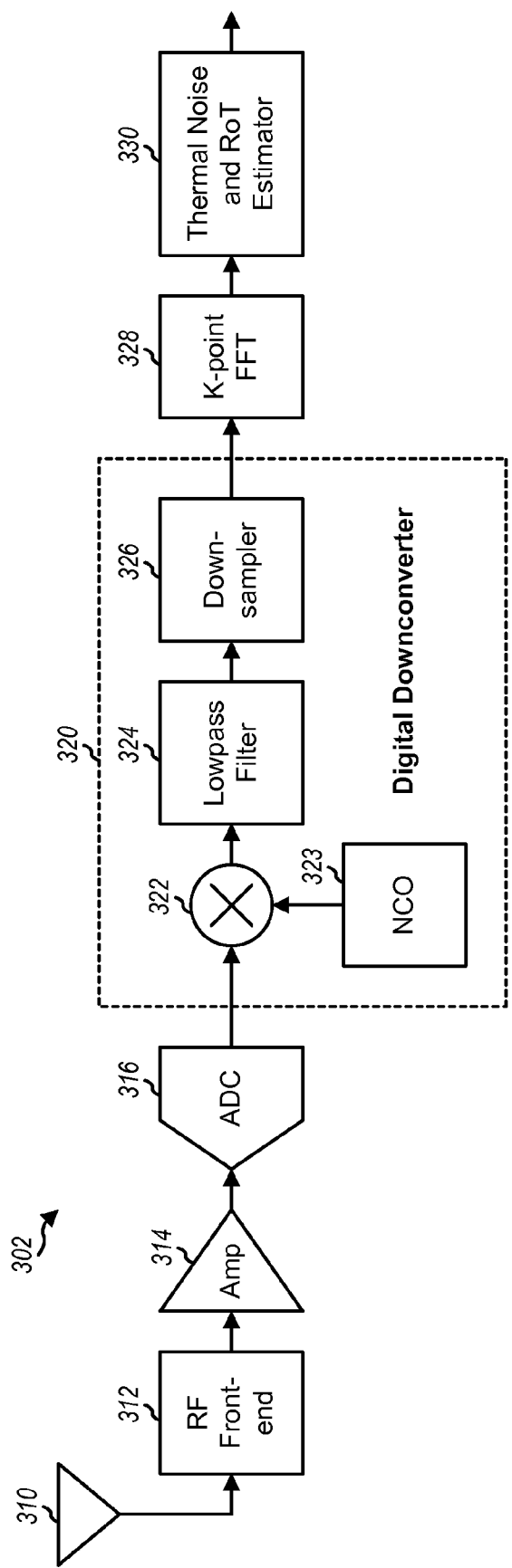
FIG. 7 shows a receiver with digital downconversion and downsampling.

FIG. 7 shows a block diagram of a design of a receiver 302 that is also capable of estimating thermal noise and RoT. Receiver 302 includes antenna 310, RF front-end unit 312, amplifier 314, and ADC 316 that operate as described above for FIG. 3. ADC 316 provides samples containing the desired CDMA signal centered at a frequency higher than DC, e.g., as shown in FIG. 4B.

A digital downconverter 320 receives the samples from ADC 316 and digitally downconverts the desired CDMA signal to DC. Within digital downconverter 320, a multiplier 322 multiplies the ADC samples with a complex sinusoidal signal from a numerically controlled oscillator (NCO) 323 and provides downconverted samples. A lowpass filter 324 filters the downconverted samples to remove images and provides filtered samples. Lowpass filter 324 has a bandwidth of $Q \cdot f_{chip}$, where Q may be an integer value of one or greater. A downsampler 326 downsamples the filtered samples from the sampling rate to an output rate of Q times the chip rate, or $f_{out} = Q \cdot f_{chip}$. The lowpass filtering removes unwanted images to avoid aliasing by the downsampling. The output samples from downsampler 326 includes the desired CDMA signal centered at DC, e.g., as shown in FIG. 5B.

The output samples from digital downconverter 320 are partitioned into blocks of K samples. An FFT unit 328 performs a K-point FFT on each block of K output samples from digital downconverter 320 and provides a corresponding block of K transform coefficients for K frequency bins to thermal noise and RoT estimator 330. The K frequency bins cover a frequency range of 0 to $f_{out}$, and adjacent frequency bins have a spacing of $\Delta f = f_{out}/K$.

Thermal noise and RoT estimator 330 operates on the transform coefficients from FFT unit 328 as described above for FIG. 3. Frequency bins $k_{sig\_start}$ and $k_{sig\_end}$ for the signal band in equation (5) are determined based on the start and end frequencies of the signal band, the FFT size K, and the output rate $f_{out}$ instead of the sampling rate $f_{samp}$. Frequency bins $k_{side1\_start}$, $k_{side1\_end}$, $k_{side2\_start}$ and $k_{side2\_end}$ for the sideband in equations (8) and (14) are determined based on the start and end frequencies of the sideband parts, the FFT size K, and the output rate $f_{out}$ instead of the sampling rate $f_{samp}$.

Receiver 300 in FIG. 3 performs K-point FFT on the samples at the higher sampling rate from ADC 316 without downsampling. A larger FFT size may be used to obtain the desired frequency bin spacing. Receiver 302 in FIG. 7 performs K-point FFT on the samples at the lower output rate from digital downconverter 320. A smaller FFT size may be used to obtain the desired frequency bin spacing with downsampling. The three leftmost columns of Table 1 give the sampling rate $f_{samp}$, the FFT size K, and the frequency bin spacing $\Delta f$ for several configurations of receiver 300 in FIG. 3 without downsampling. The three rightmost columns of Table 1 give the output rate $f_{out}$, the FFT size K, and the frequency bin spacing $\Delta f$ for several configurations of receiver 302 in FIG. 7 with downsampling. The frequency bin spacing assumes a chip rate of $f_{chip} = 3.84$ Mcps for WCDMA.

TABLE 1

| Receiver 300 in FIG. 3 | | | Receiver 302 in FIG. 7 | | |
|---|---|---|---|---|---|
| Sampling Rate $f_{samp}$ | FFT Size K | Frequency Bin Spacing $\Delta f$ | Output Rate $f_{out}$ | FFT Size K | Frequency Bin Spacing $\Delta f$ |
| $8 \cdot f_{chip}$ | 4096 | 7.5 KHz | $2 \cdot f_{chip}$ | 512 | 15 KHz |
| $16 \cdot f_{chip}$ | 4096 | 15 KHz | $3 \cdot f_{chip}$ | 1024 | 11.25 KHz |
| $16 \cdot f_{chip}$ | 8192 | 7.5 KHz | $4 \cdot f_{chip}$ | 1024 | 7.5 KHz |
| $24 \cdot f_{chip}$ | 8192 | 11.25 KHz | | | |

As shown in Table 1, finer frequency bin resolution may be obtained by (i) performing FFT on samples at lower rate (while avoiding aliasing in the frequency range of interest) and/or (ii) using larger FFT size with more points. Receiver 302 can provide a given frequency bin spacing with a smaller FFT size using additional circuitry for digital downconverter 320. Receiver 300 can provide the same frequency bin spacing with a larger FFT size without using digital downconverter 320.

The estimated RoT from equation (15) or (17) may be used for scheduling, admission control, and/or other purposes. The scheduling of users based on available load determined with the estimated RoT is described in commonly assigned U.S. patent application Ser. No. 12/031,245, entitled "SCHEDULING BASED ON RISE-OVER-THERMAL IN A WIRELESS COMMUNICATION SYSTEM," filed Feb. 14, 2008.

For clarity, certain aspects of the techniques have been described for estimating thermal noise and RoT in a CDMA system. In general, the techniques may be used to estimate thermal noise in any wireless communication system, wireline communication system, etc. The estimated thermal noise may be used to compute various metrics. For example, the estimated thermal noise may be used to compute interference-over-thermal (IoT) in an OFDMA system or an SC-FDMA system. An OFDMA or SC-FDMA system may include N total subcarriers. A subset of the N total subcarriers may be usable subcarriers, and remaining subcarriers may serve as guard subcarriers. The thermal noise may be estimated based on (i) received power in the sideband between carriers or channels, as described above, (ii) received power for the guard subcarriers, or (iii) received power for a frequency range not used for communication.

Figure 8:
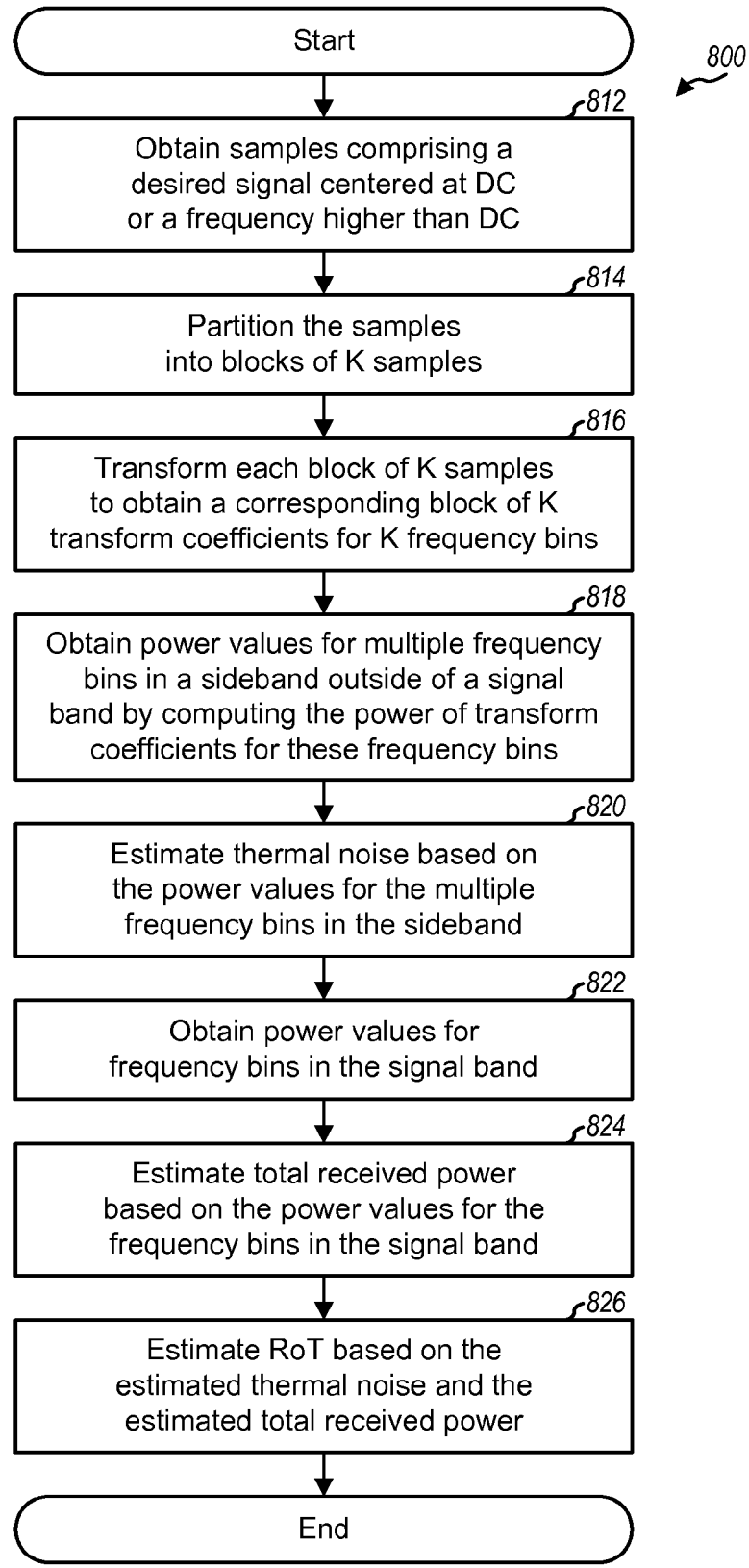
FIG. 8 shows a process for estimating thermal noise and RoT.

FIG. 8 shows a design of a process 800 for estimating thermal noise and RoT in a communication system. Process 800 may be performed by a Node B or some other entity. Samples comprising a desired signal centered at DC or a frequency higher than DC may be obtained (block 812). The samples may be partitioned into blocks of K samples (block 814). Each block of K samples may be transformed (e.g., with an FFT) to obtain a corresponding block of K transform coefficients for K frequency bins (block 816). Power values for multiple frequency bins in a sideband outside of a signal band may be obtained by computing the power of transform coefficients for these frequency bins (block 818). Thermal noise may be estimated based on the power values for the multiple frequency bins in the sideband (block 820).

FIG. 9 shows a design of a process 900 for estimating thermal noise based on a minimum point in the sideband. Process 900 is one design of block 820 in FIG. 8. Multiple blocks of power values may be obtained, with each block comprising power values for the multiple frequency bins in the sideband (block 912). The power values for each frequency bin in the sideband may be averaged across the multiple blocks to obtain an average power value for the frequency bin, e.g., as shown in equation (13) (block 914). In one design, the smallest average power value among multiple average power values for the multiple frequency bins may be determined (block 914). The thermal noise may then be estimated based on the smallest average power value, e.g., as shown by the denominator in equation (17) (block 916). In another design, the thermal noise may be estimated based on at least one average power value among the multiple average power values.

FIG. 10 shows a design of a process 1000 for estimating thermal noise based on total power of the sideband. Process 1000 is another design of block 820 in FIG. 8. Total power of the sideband for each block of transform coefficients may be determined based on a corresponding block of power values for the multiple frequency bins in the sideband, e.g., as shown in equation (8) or (10) (block 1012). The total power of the sideband may be filtered across multiple blocks, e.g., as shown in equation (11) (block 1014). The thermal noise may then be estimated based on the filtered total power of the sideband, e.g., as shown by the denominator in equation (15) (block 1016).

Referring back to FIG. 8, power values for frequency bins in the signal band may be obtained (block 822). Total received power may be estimated based on the power values for the frequency bins in the signal band (block 824). In one design of block 824, the total power of the signal band may be determined for each of multiple blocks, e.g., as shown in equation (5). The total power of the signal band may be filtered across multiple blocks, e.g., as shown in equation (7). The total received power may then be estimated based on the filtered total power of the signal band.

RoT may be estimated based on the estimated thermal noise and the estimated total received power, e.g., as shown in equation (15) or (17) (block 826). RoT may be estimated based further on an effective signal band for the total received power, a calibration factor selected to provide a predetermined RoT value when no signal is applied, etc. Alternatively or additionally, IoT may be estimated based on the estimated thermal noise. Alternatively or additionally, IoT may be estimated based on the estimated thermal noise. For IoT estimation, the total interference power may be obtained by subtracting the total received power from all UEs in a given cell from the total received power in a signal band. The total received power from all UEs in the cell can be determined by tracking the receive power levels of these UEs.

In one design, an analog signal may be undersampled to obtain samples comprising a desired signal centered at DC (e.g., as shown in FIG. 5A) or at a frequency higher than DC (e.g., as shown in FIG. 4A). In another design, the analog signal may be oversampled to obtain samples comprising the desired signal centered at DC or a frequency higher than DC.

In one design, samples comprising the desired signal centered at a frequency higher than DC may be obtained with undersampling or oversampling and may be transformed. The frequency bins in the sideband may comprise frequency bins in a left sideband part and frequency bins in a right sideband part, e.g., as shown in FIG. 4B. In another design, samples comprising the desired signal centered at DC may be obtained with undersampling or oversampling. In yet another design, samples comprising the desired signal centered at a frequency higher than DC may be digitally downconverted to obtain samples comprising the desired signal centered at DC, e.g., as shown in FIG. 7. For the later two designs, the samples comprising the desired signal centered at DC may be transformed. The frequency bins in the sideband may comprise frequency bins in one sideband part, e.g., as shown in FIG. 5B. For all designs, the frequency bins in the sideband may be determined based on frequency spacing between adjacent CDMA channels, the sample rate, the FFT size, etc.

Figure 11:
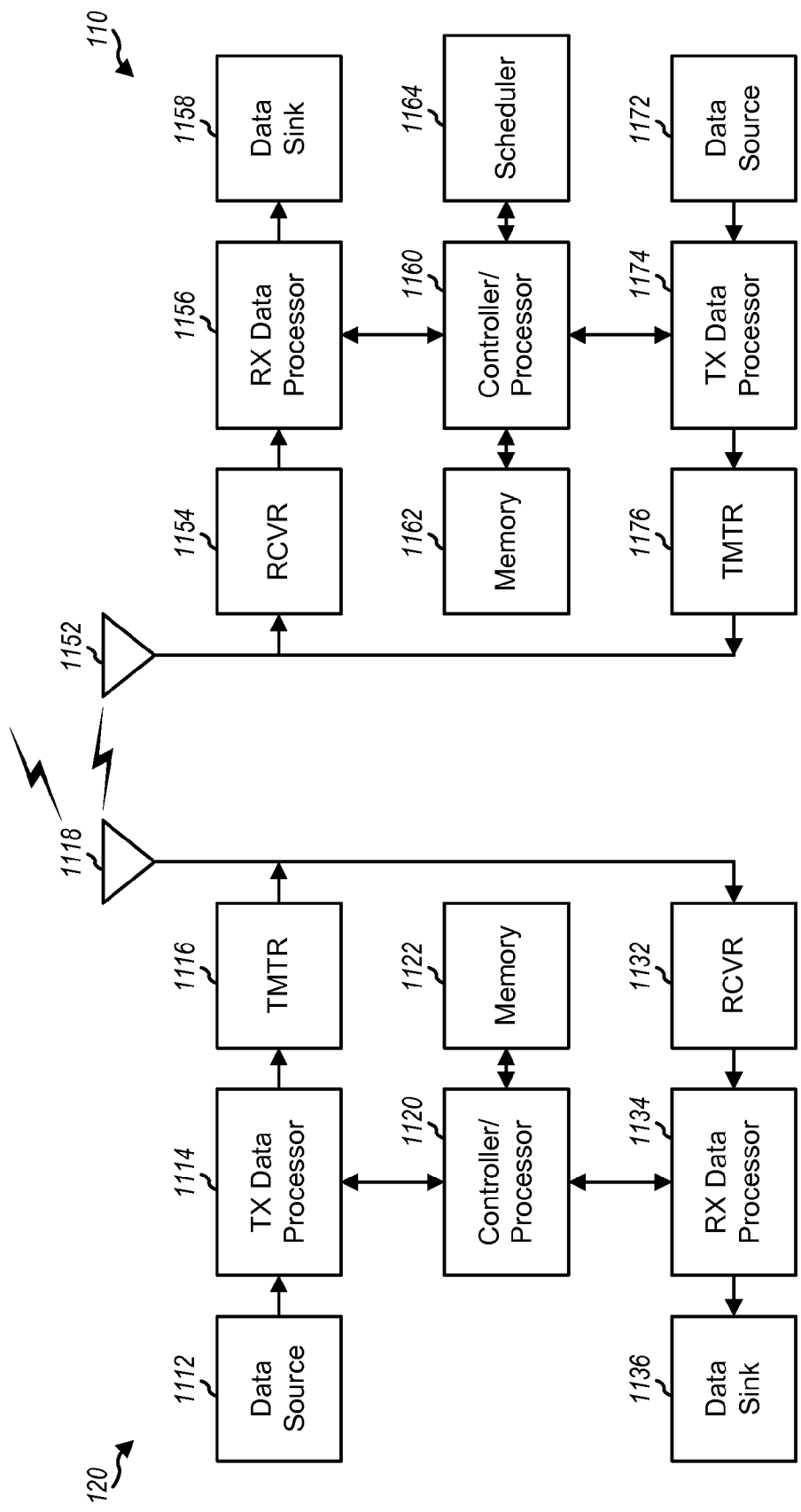
FIG. 11 shows a block diagram of a Node B and a UE.

FIG. 11 shows a block diagram of a design of a Node B 110 and a UE 120, which are one of the Node Bs and one of the UEs in system 100 in FIG. 1. At UE 120, a transmit (TX) data processor 1114 receives traffic data from a data source 1112 and control information from a controller/processor 1120. TX data processor 1114 processes (e.g., encodes and symbol maps) the data and control information, performs modulation (e.g., for CDMA), and provides output chips. A transmitter (TMTR) 1116 conditions (e.g., converts to analog, filters, amplifies, and upconverts) the output chips and generates an uplink signal, which is transmitted via an antenna 1118.

At Node B 110, an antenna 1152 receives the uplink signals from UE 120 and other UEs and provides a received RF signal to a receiver (RCVR) 1154. Receiver 1154 conditions and digitizes the received RF signal and provides samples. Receiver 1154 may include RF front-end unit 312, amplifier 314, and ADC 316 in FIG. 3. A received (RX) data processor 1156 performs demodulation on the samples (e.g., for CDMA) and demodulates and decodes the resultant symbols to obtain decoded data and control information. Processor 1156 provides the decoded data to a data sink 1158 and the decoded control information to a controller/processor 1160.

On the downlink, a TX data processor 1174 at Node B 110 receives traffic data from a data source 1172 for UEs scheduled for transmission on the downlink and control information from controller/processor 1160. The data and control information are processed (e.g., encoded, symbol mapped, and modulated) by TX data processor 1174 and further conditioned by a transmitter 1176 to generate a downlink signal, which is transmitted via antenna 1152. At UE 120, the downlink signal from Node B 110 is received by antenna 1118, conditioned by a receiver 1132, and demodulated and decoded by an RX data processor 1134.

Controllers/processors 1120 and 1160 direct the operation at UE 120 and Node B 110, respectively. Controller/processor 1160 may perform or direct process 800 in FIG. 8, process 900 in FIG. 9, process 1000 in FIG. 10, and/or other processes for the techniques described herein. Processor 1156 and/or 1160 may include units 318 and 330 in FIG. 3, units 320, 328 and 330 in FIG. 7, etc. Memories 1122 and 1162 store program code and data for UE 120 and Node B 110, respectively. A scheduler 1164 may schedule UEs for data transmission on the downlink and/or uplink and may assign resources to the scheduled UEs. Scheduler 1164 may perform scheduling using the estimated RoT.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A method of estimating thermal noise in a communication system, comprising:
receiving one or more signals in a signal band; obtaining power values for multiple frequency bins in a sideband outside of the signal band; determining a sideband thermal noise for the sideband based at least in part on the power and estimating thermal noise for the signal band using the sideband thermal noise, wherein the sideband comprises guard subcarriers and the signal band comprises subcarriers among a plurality of subcarriers.

2. The method of claim 1, wherein the obtaining the power values comprises
partitioning samples of the signal band into blocks of K samples, where K is greater than one,
transforming each block of K samples to obtain a corresponding block of K transform coefficients for K frequency bins, and
computing power of transform coefficients for the multiple frequency bins in the sideband to obtain the power values.

3. The method of claim 1, wherein the determining the sideband thermal noise comprises
averaging power values for each of the multiple frequency bins across multiple blocks to obtain an average power value for the frequency bin, and
determining the sideband thermal noise based on at least one average power value among multiple average power values for the multiple frequency bins.

4. The method of claim 1, wherein the determining the sideband thermal noise comprises
averaging power values for each of the multiple frequency bins across multiple blocks to obtain an average power value for the frequency bin,
determining a smallest average power value among multiple average power values for the multiple frequency bins, and
determining the sideband thermal noise based on the smallest average power value.

5. The method of claim 1, wherein the determining the sideband thermal noise comprises
determining total power of the sideband based on the power values for the multiple frequency bins, and
determining the sideband thermal noise based on the total power of the sideband.

6. The method of claim 1, wherein the determining the sideband thermal noise comprises
determining total power of the sideband for each of multiple blocks, each block comprising power values for the multiple frequency bins,
filtering the total power of the sideband across the multiple blocks, and
determining the sideband thermal noise based on the filtered total power of the sideband.

7. The method of claim 1, further comprising:
obtaining power values for frequency bins in the signal band related to the one or more signals;
estimating total received power based on the power values for the frequency bins in the signal band; and
estimating rise-over-thermal (RoT) of the signal band based on the estimated thermal noise and the estimated total received power.

8. The method of claim 7, wherein the estimating the total received power comprises
determining total power of the signal band for each of multiple blocks, each block comprising power values for the frequency bins in the signal band related to the one or more signals,
filtering the total power of the signal band across the multiple blocks, and
estimating the total received power based on the filtered total power of the signal band.

9. The method of claim 7, wherein the estimating the RoT comprises
estimating the RoT based further on an effective signal band for the total received power.

10. The method of claim 7, wherein the estimating the RoT comprises
estimating the RoT based further on a calibration factor selected to provide a predetermined RoT value when no signal is applied.

11. The method of claim 1, further comprising:
estimating interference-over-thermal (IoT) of the system band based on the estimated thermal noise.

12. The method of claim 1, wherein the obtaining the power values comprises
sampling an analog signal to obtain samples comprising a desired signal centered at a frequency higher than direct current (DC),
transforming blocks of K samples to obtain blocks of K transform coefficients for K frequency bins, where K is greater than one, and
computing power of transform coefficients for the multiple frequency bins in the sideband to obtain the power values.

13. The method of claim 12, wherein the multiple frequency bins in the sideband comprise frequency bins in a left sideband part and frequency bins in a right sideband part.

14. The method of claim 1, wherein the obtaining the power values comprises
sampling an analog signal to obtain samples comprising a desired signal centered at direct current (DC),
transforming blocks of K samples to obtain blocks of K transform coefficients for K frequency bins, where K is greater than one, and
computing power of transform coefficients for the multiple frequency bins in the sideband to obtain the power values.

15. The method of claim 1, wherein the obtaining the power values comprises
sampling an analog signal to obtain first samples comprising a desired signal centered at a frequency higher than direct current (DC),
digitally downconverting the first samples to obtain second samples comprising the desired signal centered at DC,
downsampling the second samples to obtain third samples,
transforming blocks of K third samples to obtain blocks of K transform coefficients for K frequency bins, where K is greater than one, and
computing power of transform coefficients for the multiple frequency bins in the sideband to obtain the power values.

16. The method of claim 1, further comprising:
determining the multiple frequency bins in the sideband based on frequency spacing between adjacent CDMA channels.

17. An apparatus for communication, comprising: at least one processor configured to: obtain power values for multiple frequency bins in a sideband outside of a signal band; measure a sideband thermal noise for the sideband based at least in part on the power values; and to estimate thermal noise for the signal band using the sideband thermal noise, wherein the sideband comprises guard subcarriers and the signal band comprises subcarriers among a plurality of subcarriers.

18. The apparatus of claim 17, wherein the at least one processor is configured to partition samples into blocks of K samples, where K is greater than one, to transform each block of K samples to obtain a corresponding block of K transform coefficients for K frequency bins, and to compute power of transform coefficients for the multiple frequency bins in the sideband to obtain the power values.

19. The apparatus of claim 17, wherein the at least one processor is configured to average power values for each of the multiple frequency bins across multiple blocks to obtain an average power value for the frequency bin, to determine a smallest average power value among multiple average power values for the multiple frequency bins, and to measure the sideband thermal noise based on the smallest average power value.

20. The apparatus of claim 17, wherein the at least one processor is configured to determine total power of the sideband for each of multiple blocks, each block comprising power values for the multiple frequency bins, to filter the total power of the sideband across the multiple blocks, and to measure the sideband thermal noise based on the filtered total power of the sideband.

21. The apparatus of claim 17, wherein the at least one processor is configured to obtain power values for frequency bins in the signal band, to estimate total received power based on the power values for the frequency bins in the signal band, and to estimate rise-over-thermal (RoT) of the signal band based on the estimated thermal noise and the estimated total received power.

22. An apparatus for communication, comprising: means for obtaining power values for multiple frequency bins in a sideband outside of a signal band; and
means for measuring a sideband thermal noise for the sideband based at least in part on the power values and estimating thermal noise for the signal band using the sideband thermal noise,
wherein the sideband comprises guard subcarriers and the signal band comprises subcarriers among a plurality of subcarriers.

23. The apparatus of claim 22, wherein the means for obtaining the power values comprises
means for partitioning samples into blocks of K samples, where K is greater than one,
means for transforming each block of K samples to obtain a corresponding block of K transform coefficients for K frequency bins, and
means for computing power of transform coefficients for the multiple frequency bins in the sideband to obtain the power values.

24. The apparatus of claim 22, wherein the means for measuring the sideband thermal noise comprises
means for averaging power values for each of the multiple frequency bins across multiple blocks to obtain an average power value for the frequency bin,
means for determining a smallest average power value among multiple average power values for the multiple frequency bins, and
means for measuring the sideband thermal noise based on the smallest average power value.

25. The apparatus of claim 22, wherein the means for measuring the sideband thermal noise comprises
means for determining total power of the sideband for each of multiple blocks, each block comprising power values for the multiple frequency bins,
means for filtering the total power of the sideband across the multiple blocks, and
means for measuring the sideband thermal noise based on the filtered total power of the sideband.

26. The apparatus of claim 22, further comprising:
means for obtaining power values for frequency bins in the signal band;

means for estimating total received power based on the power values for the frequency bins in the signal band; and means for estimating rise-over-thermal (RoT) of the signal band based on the estimated thermal noise and the estimated total received power.

27. A computer program product, comprising: a non-transitory computer-readable medium comprising: code for causing the at least one computer to obtain power values for multiple frequency bins in a sideband outside of a signal band; code for causing the at least one computer to determine a sideband thermal noise in the sideband based at least in part on the power values; and code for causing the at least one computer to estimate thermal noise for the signal band using the sideband thermal noise, wherein the sideband comprises guard subcarriers and the signal band comprises subcarriers among a plurality of subcarriers.

28. The computer program product of claim 27, the computer-readable medium further comprising:
    code for causing the at least one computer to partition samples into blocks of K samples, where K is greater than one;
    code for causing the at least one computer to transform each block of K samples to obtain a corresponding block of K transform coefficients for K frequency bins; and
    code for causing the at least one computer to compute power of transform coefficients for the multiple frequency bins in the sideband to obtain the power values.

29. The computer program product of claim 27, the computer-readable medium further comprising:
    code for causing the at least one computer to average power values for each of the multiple frequency bins across multiple blocks to obtain an average power value for the frequency bin;
    code for causing the at least one computer to determine a smallest average power value among multiple average power values for the multiple frequency bins; and
    code for causing the at least one computer to measure the sideband thermal noise based on the smallest average power value.

30. The computer program product of claim 27, the computer-readable medium further comprising:
    code for causing the at least one computer to determine total power of the sideband for each of multiple blocks, each block comprising power values for the multiple frequency bins;
    code for causing the at least one computer to filter the total power of the sideband across the multiple blocks; and
    code for causing the at least one computer to measure the sideband thermal noise based on the filtered total power of the sideband.

31. The computer program product of claim 27, the computer-readable medium further comprising:
    code for causing the at least one computer to obtain power values for frequency bins in the signal band;
    code for causing the at least one computer to estimate total received power based on the power values for the frequency bins in the signal band; and
    code for causing the at least one computer to estimate rise-over-thermal (RoT) of the signal band based on the estimated thermal noise and the estimated total received power.

32. A method of estimating thermal noise in a communication system, comprising: receiving one or more signals over a signal band; obtaining multiple blocks of power values, each block comprising power values for multiple frequency bins in a sideband outside of the signal band; averaging power values for each of the multiple frequency bins across the multiple blocks to obtain an average power value for the frequency bin, determining a smallest average power value among multiple average power values for the multiple frequency bins; and estimating a sideband thermal noise for the sideband based on the smallest average power value and estimating a rise-over-thermal for the signal band using the sideband thermal noise for a corresponding thermal noise measurement of the signal band, wherein the sideband comprises guard subcarriers and the signal band comprises subcarriers among a plurality of subcarriers.

33. The method of claim 32, further comprising:
    partitioning samples into blocks of K samples, where K is greater than one;
    transforming each block of K samples to obtain a corresponding block of K transform coefficients for K frequency bins; and
    computing power of transform coefficients for the multiple frequency bins in each block of K transform coefficients to obtain a corresponding block of power values for the multiple frequency bins.

34. A method of estimating thermal noise in a communication system, comprising: receiving one or more signals over a signal band; obtaining samples comprising a desired signal centered at a frequency higher than direct current (DC) of the signal band; partitioning the samples into blocks of K samples, where K is greater than one; transforming each block of K samples to obtain a corresponding block of K transform coefficients for K frequency bins; demultiplexing each block of K transform coefficients to obtain transform coefficients for multiple frequency bins in a left sideband part and a right sideband part outside of the signal band; computing power of the transform coefficients for the multiple frequency bins to obtain power values for the multiple frequency bins; estimating a sideband thermal noise of the sideband based on the power values for the multiple frequency bins; and estimating a rise-over-thermal for the signal band using the sideband thermal noise as a corresponding thermal noise measurement of the signal band, wherein the sideband comprises guard subcarriers and the signal band comprises subcarriers among a plurality of subcarriers.

35. The method of claim 34, wherein the estimating the thermal noise comprises
    averaging power values for each of the multiple frequency bins across multiple blocks to obtain an average power value for the frequency bin,
    determining a smallest average power value among multiple average power values for the multiple frequency bins, and
    estimating the thermal noise based on the smallest average power value.

36. The method of claim 34, wherein the estimating the thermal noise comprises
    determining total power of the sideband for each block of K transform coefficients based on a corresponding block of power values for the multiple frequency bins,
    filtering the total power of the sideband across multiple blocks of K transform coefficients, and
    estimating the thermal noise based on the filtered total power of the sideband.

* * * * *